US012579708B2

(12) United States Patent
Zhuge et al.

(10) Patent No.: US 12,579,708 B2
(45) Date of Patent: Mar. 17, 2026

(54) CHARACTER DISPLAY METHOD AND APPARATUS, ELECTRONIC DEVICE, AND COMPUTER-READABLE STORAGE MEDIUM

(71) Applicant: BEIJING BYTEDANCE NETWORK TECHNOLOGY CO., LTD., Beijing (CN)

(72) Inventors: Jingjing Zhuge, Beijing (CN); Guangyao Ni, Beijing (CN); Yepeng Chen, Beijing (CN); Yanhao Shen, Beijing (CN); Hui Yang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 318 days.

(21) Appl. No.: 18/245,112

(22) PCT Filed: Aug. 24, 2021

(86) PCT No.: PCT/CN2021/114373
§ 371 (c)(1),
(2) Date: Mar. 13, 2023

(87) PCT Pub. No.: WO2022/083273
PCT Pub. Date: Apr. 28, 2022

(65) Prior Publication Data
US 2023/0351651 A1 Nov. 2, 2023

(30) Foreign Application Priority Data
Oct. 23, 2020 (CN) .......................... 202011143752.5

(51) Int. Cl.
*G06T 11/20* (2006.01)
*G06T 11/00* (2006.01)

(52) U.S. Cl.
CPC .......... *G06T 11/203* (2013.01); *G06T 11/001* (2013.01)

(58) Field of Classification Search
None
See application file for complete search history.

(56) References Cited

U.S. PATENT DOCUMENTS

2014/0320507 A1    10/2014  Myung et al.
2015/0006174 A1*    1/2015  Homma ................... G09B 5/06
                                                              704/235
2019/0155946 A1*    5/2019  Jaroch .................... G06Q 50/01

FOREIGN PATENT DOCUMENTS

CN         101567184 A      10/2009
CN         102148048 A       8/2011
(Continued)

OTHER PUBLICATIONS

Henry Johnston, YouTube video "Adobe After Effects tutorial: Turn Random Letters Into Text", Nov. 23, 2016 (Year: 2016).*
(Continued)

*Primary Examiner* — Yi Wang

(57) ABSTRACT

Provided are a character display method and apparatus, an electronic device, and a computer-readable storage medium. The character display method includes: obtaining a to-be-displayed character; determining a display position of the to-be-displayed character in a screen based on a current timestamp; displaying a dynamic character effect at the display position; and displaying the to-be-displayed character at the display position after a first time has lapsed. In the embodiments of the present disclosure, the display position of the to-be-displayed character is determined based on the timestamp and the dynamic character effect is displayed before displaying the to-be-displayed character. Thus, the character can be displayed in a more dynamical and flexible manner.

16 Claims, 5 Drawing Sheets

(56)     References Cited

FOREIGN PATENT DOCUMENTS

| CN | 103593338 A |   | 2/2014 |   |   |
|----|-------------|---|--------|---|---|
| CN | 105279140 A |   | 1/2016 |   |   |
| CN | 107257507 A |   | 10/2017 |   |   |
| CN | 107943964 A |   | 4/2018 |   |   |
| CN | 107944397 A |   | 4/2018 |   |   |
| CN | 108419113 A |   | 8/2018 |   |   |
| CN | 109257499 A | * | 1/2019 | ........ | H04M 1/72439 |
| CN | 112256176 A |   | 1/2021 |   |   |

OTHER PUBLICATIONS

Search Report issued Oct. 28, 2021 for PCT Application No. PCT/CN2021/114373, English translation (6 pages).
First Office Action issued Sep. 15, 2021 in CN Appl. No. 202011143752. 5, English translation (18 pages).
Grant Notice dated Mar. 2, 2022 in CN Appl. No. 202011143752.5, English translation (3 pages).
Written Opinion for International Application No. PCT/CN2021/ 114373, mailed Oct. 28, 2021, 11 Pages.

* cited by examiner

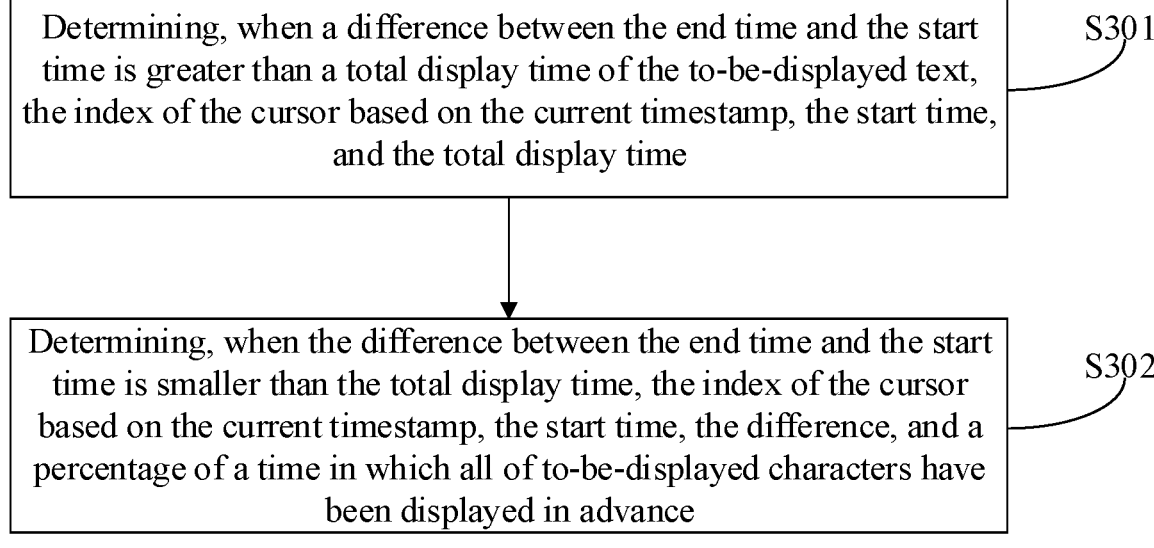

Determining, when a difference between the end time and the start time is greater than a total display time of the to-be-displayed text, the index of the cursor based on the current timestamp, the start time, and the total display time                    S301

Determining, when the difference between the end time and the start time is smaller than the total display time, the index of the cursor based on the current timestamp, the start time, the difference, and a percentage of a time in which all of to-be-displayed characters have been displayed in advance                    S302

FIG. 3

Dividing the first time into n time slots, where n is a positive integer greater than 1                    S401

Displaying randomly n alternative characters at the display position within the n time slots, the n time slots and the n alternative characters being in a one-to-one correspondence                    S402

FIG. 4

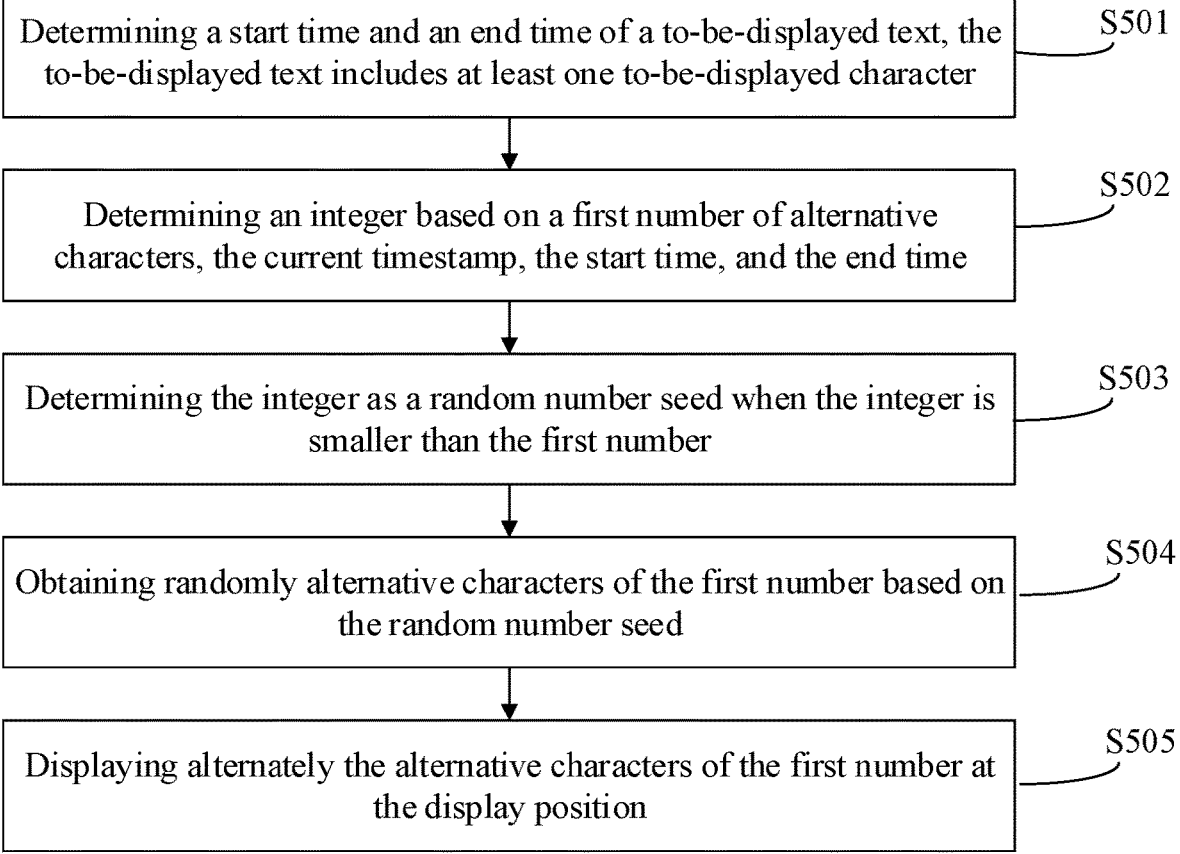

Determining a start time and an end time of a to-be-displayed text, the to-be-displayed text includes at least one to-be-displayed character — S501

Determining an integer based on a first number of alternative characters, the current timestamp, the start time, and the end time — S502

Determining the integer as a random number seed when the integer is smaller than the first number — S503

Obtaining randomly alternative characters of the first number based on the random number seed — S504

Displaying alternately the alternative characters of the first number at the display position — S505

FIG. 5

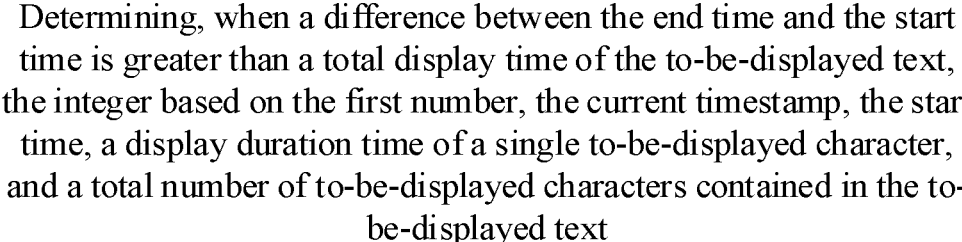

Determining, when a difference between the end time and the start time is greater than a total display time of the to-be-displayed text, the integer based on the first number, the current timestamp, the start time, a display duration time of a single to-be-displayed character, and a total number of to-be-displayed characters contained in the to-be-displayed text

S601

Determining, when the difference between the end time and the start time is smaller than the total display time, the integer based on the first number, the current timestamp, the start time, the difference, a percentage of a time in which all of to-be-displayed characters in the to-be-displayed text have been displayed in advance, and the total number of the to-be-displayed characters contained in the to-be-displayed text

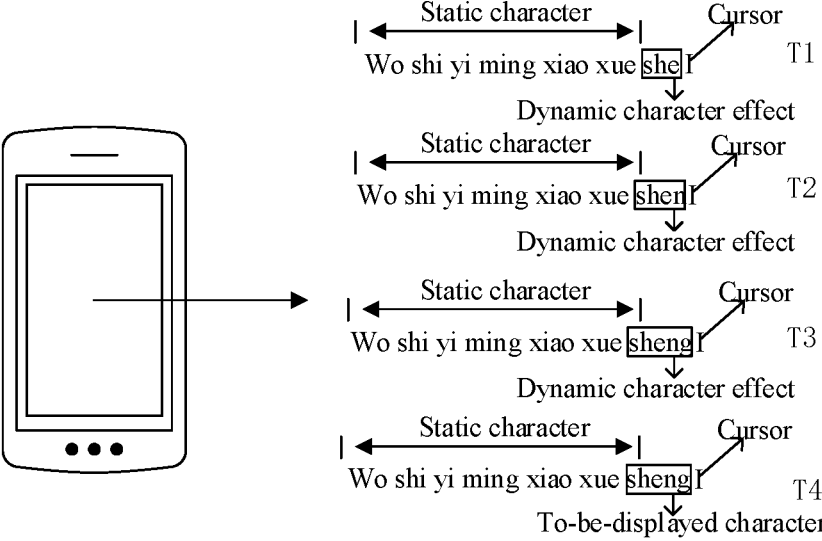

FIG. 7

CHARACTER DISPLAY METHOD AND APPARATUS, ELECTRONIC DEVICE, AND COMPUTER-READABLE STORAGE MEDIUM

CROSS-REFERENCE TO RELATED APPLICATIONS

This application claims priority to Chinese Patent Application No. 202011143752.5, filed with China National Intellectual Property Administration on Oct. 23, 2020 and entitled with "CHARACTER DISPLAY METHOD AND APPARATUS, ELECTRONIC DEVICE, AND COMPUTER-READABLE STORAGE MEDIUM", the entire content of which is incorporated herein by reference.

FIELD

The present disclosure relates to the field of character display technology, and more particularly, to a character display method and apparatus, an electronic device, and a computer-readable storage medium.

BACKGROUND

A video usually contains character information such as actor's lines or lyrics, which is displayed as the video plays. The current display method is that when the video is played to a character display position, the corresponding character information is directly displayed, which makes it look dull and not flexible enough.

SUMMARY

The summary is provided to briefly introduce the concepts, and these concepts will be described in detail in the following specific embodiments. The summary is neither intended to identify the key or essential features of the technical solutions to be protected, nor intended to limit the scope of the claimed technical solutions.

The present disclosure provides a character display method, which solves at least partially the problem of looking dull and not flexible enough resulted from directly displaying the character information in the related art. In addition, the present disclosure provides a character display apparatus, a character display hardware device, a computer-readable storage medium, and a character display terminal.

To achieve the above objects, the technical solution is provided below according to an aspect of the present disclosure.

A character display method includes: obtaining a to-be-displayed character: determining a display position of the to-be-displayed character in a screen based on a current timestamp: displaying a dynamic character effect at the display position; and displaying the to-be-displayed character at the display position after a first time has lapsed.

To achieve the above objects, the technical solution is provided below according to an aspect of the present disclosure.

A character display apparatus includes: a to-be-displayed character obtaining module configured to obtain a to-be-displayed character: a display position determination module configured to determine a display position of the to-be-displayed character in a screen based on a current timestamp; and a character display module configured to display a dynamic character effect at the display position;

and display the to-be-displayed character at the display position after a first time has lapsed.

To achieve the above object, the technical solution is provided below according to an aspect of the present disclosure.

An electronic device includes: a memory having non-transient computer-readable instructions stored thereon; and a processor configured to execute the computer-readable instructions to cause the processor to implement the character display method according to any of the above technical solutions.

To achieve the above object, the technical solution is provided below according to an aspect of the present disclosure.

A computer-readable storage medium has non-transient computer-readable instructions stored thereon. The non-transient computer-readable instructions, when executed by a computer, cause the computer to implement the character display method according to any of the above technical solutions.

To achieve the above object, the technical solution is provided below according to an aspect of the present disclosure.

A character display terminal includes any of the above character display apparatus.

The embodiments of the present disclosure provide a character display method and apparatus, an electronic device, and a computer-readable storage medium. The character display method includes: obtaining a to-be-displayed character: determining a display position of the to-be-displayed character in a screen based on a current timestamp: displaying a dynamic character effect at the display position; and displaying the to-be-displayed character at the display position after a first time has lapsed. In the embodiments of the present disclosure, the display position of the to-be-displayed character is determined based on the timestamp, and the dynamic character effect is displayed before the to-be-displayed character is displayed. Thus, the character can be displayed in a more dynamical and flexible manner.

The above description is only an overview of the technical solutions of the present disclosure. In order to have a better understanding of the technical features of the present disclosure and implement them in accordance with the contents of the description, and to make the above and other objects, features and advantages of the present disclosure more obvious and understandable, the following is preferred embodiments, and is described in detail with the accompanying drawings.

BRIEF DESCRIPTION OF THE DRAWINGS

The above and other features, advantages, and aspects of various embodiments of the present disclosure will become more apparent in conjunction with the accompanying drawings and with reference to the following specific implementations. Throughout the drawings, the same or similar reference signs indicate the same or similar elements. It should be understood that the drawings are illustrative, and members and elements are not necessarily drawn to scale.

FIG. 3 is a further schematic flowchart of a character display method according to an embodiment of the present disclosure.

FIG. 4 is a further schematic flowchart of a character display method according to an embodiment of the present disclosure.

FIG. 5 is a further schematic flowchart of a character display method according to an embodiment of the present disclosure.

FIG. 6 is a further schematic flowchart of a character display method according to an embodiment of the present disclosure.

FIG. 7 is a schematic diagram of an application scenario of a character display method according to an embodiment of the present disclosure.

DETAILED DESCRIPTION

Figure 1:
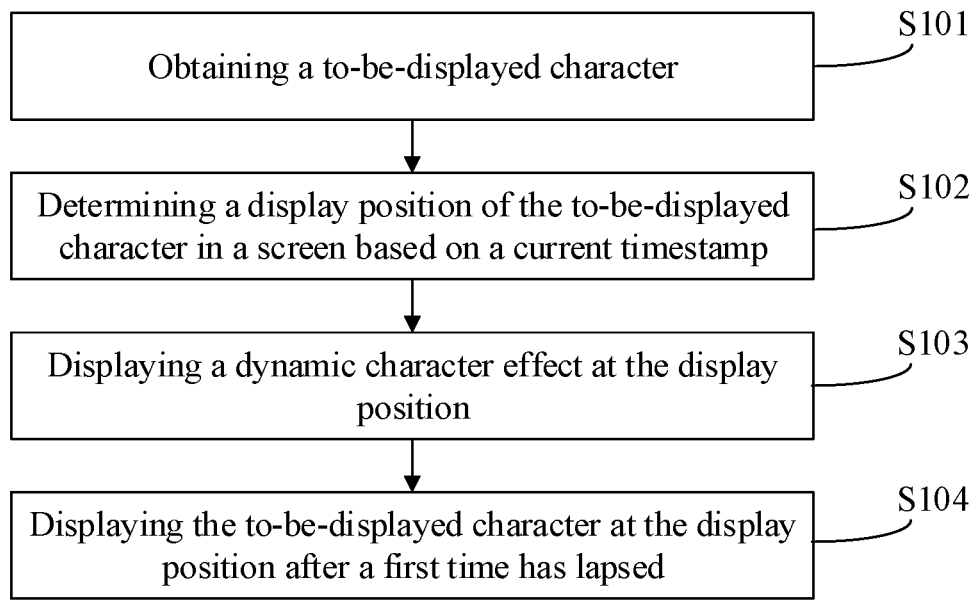
FIG. 1 is a schematic flowchart of a character display method according to an embodiment of the present disclosure.

Hereinafter, the embodiments of the present disclosure will be described in more detail with reference to the accompanying drawings. Although some embodiments of the present disclosure are illustrated in the drawings, it should be understood that the present disclosure can be implemented in various forms and should not be construed as being limited to the embodiments set forth herein. On the contrary, these embodiments are provided to help a more thorough and complete understanding of the present disclosure. It should be understood that the drawings and embodiments of the present disclosure are only used for illustration purposes, rather than limiting the scope of the present disclosure.

It should be understood that steps recited in the method embodiments of the present disclosure may be executed in different orders and/or in parallel. In addition, method embodiments may include additional steps and/or omit to perform the illustrated steps. The scope of the present disclosure is not limited in the aspect.

The term "including" and its variants as used herein are open-ended including, i.e., "including, but not limited to". The term "based on" means "at least in part based on". The term "an embodiment" means "at least one embodiment": the term "another embodiment" means "at least one additional embodiment": the term "some embodiments" means "at least some embodiments". Related definitions of other terms will be provided in the following description.

It should be noted that the terms "first" and "second" mentioned in the present disclosure are only used to distinguish apparatuses, modules or units, rather than limiting the order or interdependence of functions performed by these apparatuses, modules or units.

It should be noted that modifications of "a" and "a plurality of" mentioned in the present disclosure are illustrative and not restrictive, and should be understood as "one or more" by those skilled in the art, unless clearly indicated otherwise in the context.

FIG. 1 is a flowchart of a character display method according to an embodiment of the present disclosure. The character display method according to the present embodiment may be implemented by a character display apparatus. The character display apparatus may be implemented as software, or implemented as a combination of software and hardware. The character display apparatus may be integrated into a device of a character display system, such as into a character display server or a character display terminal device. As shown in FIG. 1, the method includes steps 101 and 102.

At step S101, a to-be-displayed character is obtained.

In some embodiments, the to-be-displayed character is obtained from a to-be-displayed text. The to-be-displayed text is a text file, in which at least one to-be-displayed character is stored. As an example, the text file includes a lyrics file, a subtitle file, or the like. In some embodiments, different to-be-displayed characters are separated from the to-be-displayed text based on an encoding of the to-be-displayed character. In this case, the step S101 includes: obtaining a to-be-displayed text including at least one to-be-displayed character; and separating the at least one to-be-displayed character from the to-be-displayed text based on a first encoding of the to-be-displayed character.

As an example, the first encoding of the to-be-displayed character is a Unicode code. Different to-be-displayed characters corresponds to different Unicode codes. In this way, the to-be-displayed character may be separated from the to-be-displayed text based on the Unicode code.

In some embodiments, the to-be-displayed character is at least one to-be-displayed character received from a human interaction interface, such as at least one to-be-displayed character received through a keyboard, a mouse, or a touch screen.

In some embodiments, the method further includes, subsequent to the step S101: generating a character texture of the to-be-displayed character: selecting a plurality of alternative characters from a character library to generate an alternative character set; and generating a character texture of the alternative character.

In some embodiments, the character texture is stored in a texture atlas including at least one non-repeating character texture. After the to-be-displayed character is obtained, it is queried whether the texture atlas contains the texture of the to-be-displayed character. If the texture atlas does not contain the texture of the to-be-displayed character, the character texture of the to-be-displayed character is generated, and the character texture of the to-be-displayed character is stored in the texture atlas. As an example, the character texture atlas further includes a texture index table for marking a correspondence between the character and the character texture (e.g., the correspondence between an identification of the character and the character texture). When it is necessary to display the to-be-displayed character, a storage location of the character texture may be found based on the identification of the character, such as the first encoding as described above, and the character texture is taken out and displayed on a display screen. The alternative character is used to generate a dynamic character effect subsequently, and may be the same or different from the to-be-displayed character. As an example, the alternative character is randomly selected from the character library. A generation process of the character texture of the alternative character is the same as the generation process of the character texture of the to-be-displayed character, details of which will be omitted herein.

It is understood that the above ways of obtaining the to-be-displayed character are only examples and do not constitute a limitation on the present disclosure.

At step S102, a display position of the to-be-displayed character in a screen is determined based on a current timestamp.

In some embodiments, a plurality of to-be-displayed characters is pre-composed prior to determining the display

6

In some embodiments, the above step S301 and step S302 are implemented by the following formula (1):

$$I_{cursor} = \begin{cases} \left\lfloor \dfrac{(timestamp - startTime)}{charTime} \right\rfloor ① & \text{if } duration > charTime * charCount \\ \left\lfloor \dfrac{timestamp - startTime) * charCount}{showPercent * duration} \right\rfloor ② & \text{if } duration < charTime * charCount \end{cases} \qquad (1)$$

position of the to-be-displayed character. In some embodiments, each of the to-be-displayed characters includes a display origin for positioning the display position of the to-be-displayed character. The pre-composing is to predetermine a position of the display origin in the screen. As an example, the to-be-displayed characters are arranged in a horizontal format, and when a length of a character row of the to-be-displayed characters arranged horizontally exceeds a predetermined length, a wrapping operation is performed on the to-be-displayed characters. A sequence of display positions of the display origins of all of the to-be-displayed characters in the screen is recorded, and then the to-be-displayed characters are displayed at the corresponding display positions in the screen based on desired display effect.

In some embodiments, the step S102 includes: step S201 of determining a start time and an end time of the to-be-displayed text, the to-be-displayed text including the at least one to-be-displayed character: step S202 of determining an index of a cursor based on the current timestamp, the start time, and the end time: step S203 of determining the display position of the to-be-displayed character in the screen based on the index of the cursor.

In some embodiments, in order to achieve a character display effect of a typing effect, the cursor is needed to be displayed at the position of the to-be-displayed character when typing. A position of the cursor is determined based on the index of the cursor, and the position of the cursor indicates the position of the to-be-displayed character.

In some embodiments, the to-be-displayed text has the start time and the end time for display: As an example, the start time and the end time are calculated based on a time parameter. If the to-be-displayed text is a sentence of lyric, the time parameter is an offset of the start time of the sentence of lyric and an offset of the end time of the sentence of lyric, and the start time and the end time of the lyrics can be calculated based on a timestamp at which a song starts.

At step S202, in order to obtain the character effect of the typing effect, the to-be-displayed character needed to be displayed at the current time, i.e., the index of the cursor, is calculated based on the current timestamp. The index of the cursor is an index of the to-be-displayed character in the to-be-displayed text, and the index of the to-be-displayed character represents the position of the to-be-displayed character in the to-be-displayed text.

In some embodiments, the step S202 includes: step S301 of determining, when a difference between the end time and the start time is greater than the total display time, the index of the cursor based on the current timestamp, the start time, and a total display time of the to-be-displayed text: or step S302 of determining, when the difference between the end time and the start time is smaller than the total display time, the index of the cursor based on the current timestamp, the start time, the difference, and a percentage of a time in which all of the to-be-displayed characters have been displayed in advance.

The condition ① in the formula (1) corresponds to step S301, and the condition ② corresponds to step S302. charTime is a display time of the to-be-displayed character. As an example, the display time of the to-be-displayed character is a duration time of the typing effect of each to-be-displayed character in the typing effect: charCount is the number of to-be-displayed characters in the to-be-displayed text: duration=endTime-startTime, which is the difference between the end time and the start time and represents a display duration of the to-be-displayed text: timestamp represents the current timestamp: startTime represents the start time of the to-be-displayed text, and endTime represents the end time of the to-be-displayed text.

In condition ①,, duration>charTime * charCount, i.e., the difference between the end time and the start time is greater than the total display time of the to-be-displayed text, and then $$I_{cursor} = \left\lfloor \frac{(timestamp - startTime)}{charTime} \right\rfloor,$$

which represents the index of the cursor of the to-be-displayed character at the current timestamp. As an example, if charTime-2 seconds, timestamp=8:00:05, and start-Time=8:00:00, then (timestamp-startTime)=5 seconds, and $$I_{cursor} = \left\lfloor \frac{5}{2} \right\rfloor = 2,$$

which means that the to-be-displayed character with the index of 2 is displayed when a time of 5 seconds has lapsed from the start time.

In condition ②, duration<charTime * charCount, i.e., the difference between the end time and the start time is smaller than the total display time. In this case, if each of the to-be-displayed characters is displayed in accordance with charTime, the display of the typing effect cannot be completed within the display duration of the to-be-displayed text. Thus, it is necessary to dynamically calculate a duration time of the typing effect of each of the to-be-displayed texts. show Percent is a control parameter, which represents the percentage of the time in which all of the to-be-displayed characters have been displayed in advance and controls a total time in which the typing effect has been displayed.

$$\frac{showPercent * duration}{charCount}$$

is the duration time of the typing effect of each of the to-be-displayed characters. Thus, it can be obtained $$I_{cursor} = \left\lfloor \frac{(timestamp - startTime) * charCount}{showPercent * duration} \right\rfloor.$$

As an example, if show Percent=0.8, duration=10 seconds, charCount=5, timestamp-8:00:05, startTime=8:00:00, then (timestamp-startTime)=5 seconds, and then $$I_{cursor} = \left\lfloor \frac{5 * 5}{8} \right\rfloor = 3,$$

which means that the to-be-displayed character with the index of 3 is displayed when a time of 5 seconds has lapsed from the start time,.

It can be understood that the above-mentioned ways of obtaining the index of the cursor is only an example and does not constitute a limitation on the present disclosure.

Figure 2:
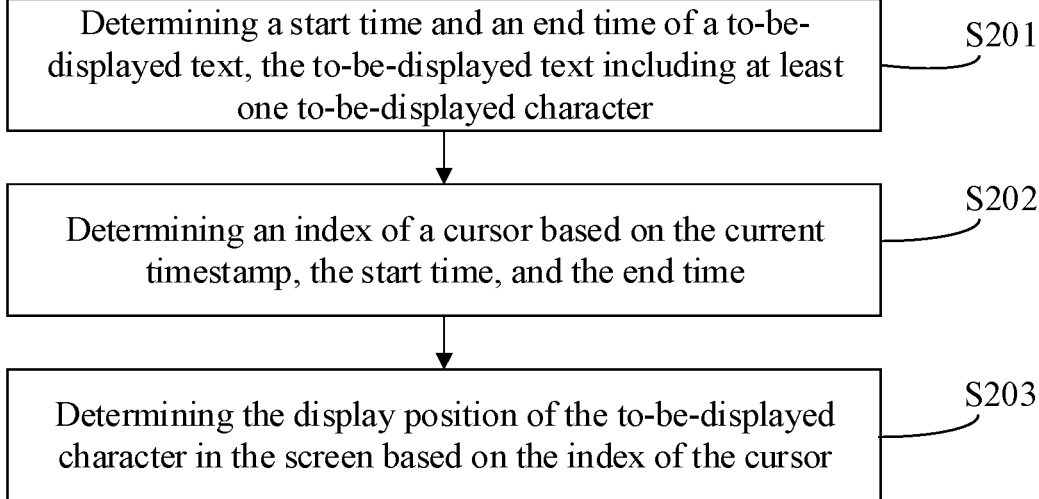
FIG. 2 is a further schematic flowchart of a character display method according to an embodiment of the present disclosure.

Referring FIG. 2 again, at step S203, subsequent to obtaining the index of the cursor, the display position of the to-be-displayed character may be determined based on the index. As shown in the above embodiments, the display position is the display position of the display origin of each of the to-be-displayed characters determined by pre-composition. That is, the display position of each of the to-be-displayed characters is determined by the pre-composition. Thus, after the to-be-displayed character is determined based on the index of the cursor, the display position of the to-be-displayed character in the display screen can be determined.

Referring to FIG. 1 again, the character display method according to the embodiments of the present disclosure further includes step S103 of displaying a dynamic character effect at the display position.

In some embodiments, the step S103 includes displaying randomly a plurality of alternative characters at the display position within a plurality of time slots in a first time. Each of the plurality of time slots corresponds to one of the plurality of alternative characters.

The alternative character is a randomly selected character from the character library. The alternative character may be the same as or different from the to-be-displayed character in type. As an example, the to-be-displayed character is a Chinese character, and the alternative character is also a Chinese character. In some embodiments, the method further includes, prior to or subsequent to the step S101: selecting randomly a plurality of characters from the character library to generate an alternative character library; and generating character textures of the plurality of alternative characters. Then, in this step, at the beginning of each time slot of the plurality of time slots within the first time, one alternative character is selected from the alternative character library randomly, a character texture of the selected alternative character is obtained, and the character texture of the alternative character is displayed at the display position.

In some embodiments, the displaying the plurality of alternative characters at the display position randomly within the plurality of time slots in the first time includes: step S401 of dividing the first time into n time slots, where n is a positive integer greater than 1; and step S402 of displaying n alternative characters at the display position randomly within the n time slots. The n time slots and the n alternative characters are in a one-to-one correspondence.

In the above steps, n is the number of predetermined alternative characters, which represents the number of alternative characters that need to be displayed within the first time.

The n time slots may be equal or unequal to each other. That is, the first time may be divided into n time slots evenly or unevenly, which is not limited herein. In the n time slots, each time slot corresponds to one alternative character. In this way, when the n time slots have lapsed in succession, an alternate display effect of alternative characters can be generated. With a fixed time length of the first time, the larger the value of n, the faster the speed at which the characters are alternately displayed.

In some embodiments, the step S103 includes: step S501 of determining a start time and an end time of the to-be-displayed text, the to-be-displayed text including at least one to-be-displayed character: step S502 of determining an integer based on a first number of the alternative characters, the current timestamp, the start time, and the end time: step S503 of determining the integer as a random number seed when the integer is smaller than the first number: step S504 of obtaining randomly alternative characters of the first number based on the random number seed; and step S505 of displaying alternately the alternative characters of the first number at the display position.

The above steps S501 to S505 describe an implementation process of the alternate display of the alternative characters. Since the process of the alternate display of the alternative characters needs to be implemented during the display of the to-be-displayed character, the start time and the end time of the to-be-displayed text are obtained at step S501.

Thereafter, the integer is determined at step S502. The integer represents an index of each of the time slots at which the alternative characters are alternately displayed. In some embodiments, when the first number of the alternative characters is n, the display time of the to-be-displayed character is divided into (n+1) time slots, and the n alternative characters are alternately displayed in the first n time slots. Thus, the integer has a value in a range of [0, n-1] at this step, corresponding to the n alternative characters, respectively.

In some embodiments, the step S502 includes: step S601 of determining, when a difference between the end time and the start time is greater than the total display time of the to-be-displayed text, the integer based on the first number, the current timestamp, the start time, and a display duration time of a single to-be-displayed character, and a total number of to-be-displayed characters contained in the to-be-displayed text: or step S602 of determining, when the difference between the end time and the start time is smaller than the total display time, the integer based on the first number, the current timestamp, the start time, the difference, and the percentage of a time in which all of the to-be-displayed characters in the to-be-displayed text have been displayed in advance, and the total number of the to-be-displayed characters contained in the to-be-displayed text.

In some embodiments, the above step S601 and step S602 can be implemented by the following formula (2):

$$range = \begin{cases} \left\lfloor \dfrac{(timestamp - startTime) \times (n+1)}{charTime} \right\rfloor \text{①, if } duration > charTime * charCount \\ \left\lfloor \dfrac{timestamp - startTime) \times charCount \times (n+1)}{showPercent * duration} \right\rfloor \text{②, if } duration < charTime * charCount \end{cases}$$

(2)

The condition ①  in the formula (2) corresponds to the step S601, and the condition ②  corresponds to the step S602. range is the integer, and charTime is the display time of the to-be-displayed character. As an example, the display time of the to-be-displayed character is a duration time of the typing effect of each of the to-be-displayed characters in the typing effect. The charCount is the number of the to-be-displayed characters in the to-be-displayed text: duration=endTime-startTime, which is a difference between the end time and the start time and represents the display duration of the to-be-displayed text: timestamp represents the current timestamp: startTime represents the start time of the to-be-displayed text: endTime represents the end time of the to-be-displayed text; and n represents the first number of the alternative characters.

In condition ①, duration>charTime * charCount, i.e., the difference between the end time and the start time is greater than the total display time of the to-be-displayed text, and then $$range = \left\lfloor \frac{(timestamp - startTime) \times (n + 1)}{charTime} \right\rfloor mod(n + 1),$$

which represents the index of the time slot where the current timestamp timestamp is located in the (n+1) time slots when the display time charTime of the to-be-displayed character is divided into (n+1) time slots.

As an example, if charTime-2 seconds, n=3, (timestamp-startTime)=2.3 seconds, then $$range = \left\lfloor \frac{2.3 \times 4}{2} \right\rfloor mod\ 4 = 0,$$

which represents the current timestamp is located in 0-th time slot of the 4 time slots of the display time of the to-be-displayed character when a time of 2.3 seconds has lapsed from the start time.

For example, if charTime=2 seconds, n=3, (timestamp-startTime)=2.6 seconds, then $$range = \left\lfloor \frac{2.6 \times 4}{2} \right\rfloor mod\ 4 = 1,$$

which represents that the current timestamp is located in a then first one of the four time slots of the display time of the to-be-displayed character when a time of 2.6 seconds has lapsed from the start time.

In the above condition ②, duration<charTime * charCount, i.e., the difference between the end time and the start time is smaller than the total display time. In this case, if each of the to-be-displayed characters is displayed in accordance with charTime, the display of the typing effect cannot be completed within the display duration of the to-be-displayed text. Thus, it is necessary to dynamically calculate the duration time of the typing effect of each of to-be-displayed texts. The show Percent is a control parameter, which represents the percentage of a time in which all of the to-be-displayed characters have been displayed and controls the total time in which the typing effect has been displayed. Thus, $$\frac{showPercent * duration}{charCount}$$

is the duration time of the typing effect of each of to-be-displayed characters. In this way, it can be obtained:

$$range = \left\lfloor \frac{(timestamp - startTime) \times charCount \times (n + 1)}{showPercent * duration} \right\rfloor mod\ (n + 1).$$

As an example, if showPercent=0.8, n=3, duration=10 seconds, (timestamp-startTime)=2.3 seconds, charCount=5, then $$range = \left\lfloor \frac{2.3 \times 5 \times 4}{0.8 * 10} \right\rfloor mod\ 4 = 1,$$

which represents that the current timestamp is located in a first one of the four time slots of the display time of the to-be-displayed character when a time of 2.3 seconds has elapsed from the start time.

As an example, if showPercent=0.8, n=3, duration=10 seconds, (timestamp-startTime)=2.6 seconds, and char-Count=5, then $$range = \left\lfloor \frac{2.6 \times 5 \times 4}{0.8 * 10} \right\rfloor mod\ 4 = 2,$$

which represents that the current timestamp is located in a second one of the four time slots of the display time of the to-be-displayed character when a time of 2.6 seconds has elapsed from the start time.

Referring to FIG. 5 again, subsequent to determining the integer, at step S503, it is determined whether the integer is smaller than the first number, i.e., whether the above range is smaller than n. When range <n, range is determined as the random number seed, and at step S504, an alternative character is randomly selected by using the random number seed to be used as the alternative character that is currently to be displayed. Thereafter, at step S505, the alternative character is displayed at the display position. Since the value of range is variable between 0 and (n-1), the alternate display effect of the alternative characters is generated.

In some embodiments, when the alternative character set and text textures are pre-generated, the step S103 includes: selecting randomly a plurality of alternative characters from the alternative character set; and displaying alternately character textures of the plurality of alternative characters at the display position in the first time.

Specific implementation of the alternate display may be the same as the implementation in the above embodiments, the details of which will be omitted herein.

In some embodiments, in order to achieve a more realistic typing effect, a cursor effect is further added in step S103. In some embodiments, the method further includes: obtaining a cursor map: determining a display position of the cursor map based on the display position of the to-be-displayed character; and displaying the cursor map at the display position of the cursor map.

In some embodiments, the cursor map is displayed in a composition direction of the to-be-displayed character. For example, for a horizontal composition from left to right, the cursor map is displayed at the right side of the to-be-displayed character. In addition, for example, for a vertical composition from top to bottom, the cursor map is displayed at the bottom side of the to-be-displayed character. Taking the horizontal composition from left to right as an example, provided that the display position of the to-be-displayed character is (O [Icursor].x, O [Icursor].y), the display position of the cursor map is (O [Icursor].x+FontSize, O [Icursor].y). That is, the display position of the cursor map is offset to the right from the display position of the to-be-displayed character by a distance of FontSize, where FontSize is a size of the character texture of the to-be-displayed character. Further, in order to realize more realistic effect, the cursor map needs to be zoomed based on the size of the character texture to enable the cursor map have the same height or width as the character texture. As shown in FIG. 7, which is an example of the cursor map, the cursor map has a height of h and a width of w; is zoomed based on a zoom factor (FontSize/h), and then is displayed in the display position of the cursor map.

In some embodiments, in order to achieve a more realistic typing effect, transparency of the cursor map can be periodically adjusted. For example, the transparency of the cursor map is variable alternately between 0 and 1 in a cycle of 0.5 seconds.

It can be understood that the above dynamic character effect of the alternate display is only an example of the dynamic character effect, which does not constitute a restriction on the present disclosure. In fact, any other dynamic character effect may be applied to the present disclosure, details of which will be omitted herein.

Referring to FIG. 1 again, the character display method described according to the embodiments of the present disclosure further includes step S104 of displaying the to-be-displayed character at the display position after a first time has lapsed.

After the dynamic character effect is displayed, the to-be-displayed character is displayed at the display position. In some embodiments, the step S104 includes: displaying the character texture of the to-be-displayed character at the display position after the first time has lapsed. As shown in the above embodiments, the display time of the to-be-displayed character is divided into n+1 time slots, and the first time is the first n time slots. The dynamic character effect is displayed in the first n time slots, and the to-be-displayed character is displayed in the last time slot.

It can be understood that after the to-be-displayed character is displayed, the to-be-displayed character is statically displayed on the screen, until the end time of the to-be-displayed text or the to-be-displayed character is reached.

In some embodiments, the alternative character and the to-be-displayed character as described above may be the same type of character, such as Chinese or English character. In this case, when displaying the alternate display effect, firstly the type of the to-be-displayed character is determined, and then the same type of character is selected as the alternative character to achieve the above alternate display effect.

FIG. 7 is a schematic diagram of an application scenario according to an embodiment of the present disclosure. The application scenario uses the character display method disclosed in the present disclosure to achieve the typing effect. As shown in FIG. 7, a sentence is displayed with a typing effect in a terminal. The typing effect is that when displaying the to-be-displayed character, the display time of the to-be-displayed character is divided into 4 time slots, characters are randomly displayed in the first 3 time slots, and the to-be-displayed character is displayed in the last 1 time slot, to simulate the process of selecting the character during the typing, in which the displayed to-be-displayed characters are displayed in a static form on the screen until the end time of the sentence is reached. As shown in FIG. 7, the displayed to-be-displayed characters "wo shi yi ming xiao xue" are statically displayed on the screen, and the to-be-displayed character is "sheng": in a time slot T1 that is the display time slot of dynamic the character effect, one alternative character "she" is randomly selected and is display at a display position of the character "sheng", and the cursor is displayed at the right side of the display position of the character "sheng": Similarly, in time slots T2 and T3 that are also the display time slots of the dynamic character effect, the alternative character in the previous time slot is replaced with random alternative characters "shen" and "sheng" respectively, to achieve the alternate display effect of the alternative characters in the time slots T1 to T3; and in a time slot T4, the to-be-displayed character "sheng" is displayed, and thus the typing effect of one character is completed. Each of the to-be-displayed characters in the whole sentence is displayed by using the above method to achieve the dynamic display of the typing effect of the sentence.

The embodiments of the present disclosure provide a character display method. The character display method includes: obtaining a to-be-displayed character: determining a display position of the to-be-displayed character in a screen based on a current timestamp: displaying a dynamic character effect at the display position; and displaying the to-be-displayed character at the display position after a first time has lapsed. In the embodiments of the present disclosure, the display position of the to-be-displayed character is determined based on the timestamp and the dynamic character effect is displayed before displaying the to-be-displayed character. Therefore, the character can be displayed in a more dynamical and flexible manner.

Although the steps of the method embodiments are described in the above order, those skilled in the art should understand that the steps according to the embodiments of the present disclosure are not necessarily performed in the above orders, and they may be performed in a reversed, parallel, interleaved manner or other orders. Besides, on the basis of the above steps, those skilled in the art may add other steps. These obvious modifications or equivalents shall fall within the scope of the present disclosure, and thus are omitted herein.

Figure 8:
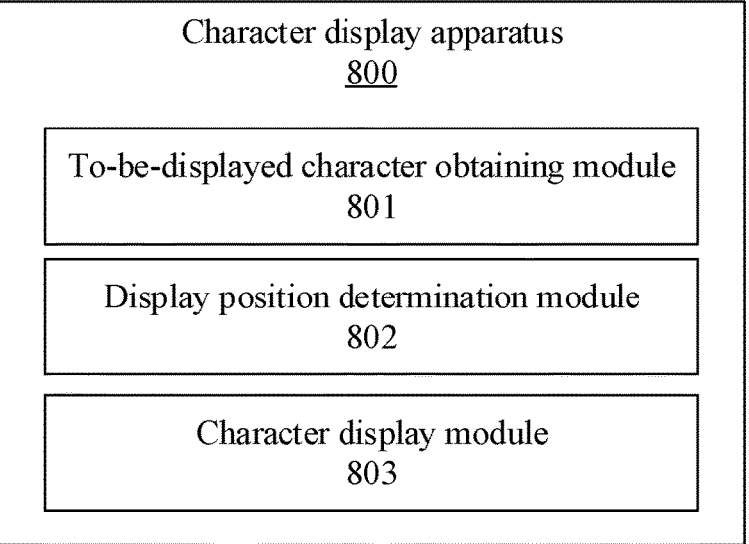
FIG. 8 is a schematic structural diagram of a character display apparatus according to an embodiment of the present disclosure.

FIG. 8 is a schematic structural diagram of a character display apparatus according to an embodiment of the present disclosure. As shown in FIG. 8, a character display apparatus 800 includes: a to-be-displayed character obtaining module 801, a display position determination module 802, and a character display module 803.

The to-be-displayed character obtaining module 801 is configured to obtain a to-be-displayed character.

The display position determination module 802 is configured to determine a display position of the to-be-displayed character in a screen based on a current timestamp.

The character display module 803 is configured to display a dynamic character effect at the display position, and display the to-be-displayed character at the display position after a first time has lapsed.

Further, the display position determination module 802 is further configured to: determine a start time and an end time of a to-be-displayed text, the to-be-displayed text including at least one to-be-displayed character: determine an index of a cursor based on the current timestamp, the start time, and the end time; and determine the display position of the to-be-displayed character in the screen based on the index of the cursor.

Further, the display position determination module 802 is further configured to: determine, when a difference between the end time and the start time is greater than the total display time, the index of the cursor based on the current timestamp, the start time, and a total display time of the to-be-displayed text: or determine, when the difference is smaller than the total display time, the index of the cursor based on the current timestamp, the start time, the difference between the end time and the start time, and a percentage of a time in which all of the to-be-displayed characters have been displayed in advance.

Further, the character display module 803 is further configured to: display randomly a plurality of alternative characters at the display position within a plurality of time slots in the first time. Each of the plurality of time slots corresponds to one of the plurality of alternative characters.

Further, the character display module 803 is further configured to: divide the first time into n time slots, where n is a positive integer greater than 1; and display randomly n alternative characters at the display position within the n time slots. The n time slots and the n alternative characters are in a one-to-one correspondence.

Further, the character display module 803 is further configured to: determine a start time and an end time of the to-be-displayed text, the to-be-displayed text including at least one to-be-displayed character: determine an integer based on a first number of the alternative characters, the current timestamp, the start time, and the end time: determine the integer as a random number seed when the integer is smaller than the first number: obtain randomly alternative characters of the first number based on the random number seed; and display alternately the alternative characters of the first number at the display position.

Further, the character display module 803 is further configured to: determine, when the difference between the end time and the start time is greater than a total display time of the to-be-displayed text, the integer based on the first number, the current timestamp, the start time, a display duration time of a single to-be-displayed character, and a total number of to-be-displayed characters contained in the to-be-displayed text: or determine, when the difference between the end time and the start time is smaller than the total display time, the integer based on the first number, the current timestamp, the start time, the difference, a percentage of a time in which all of the to-be-displayed characters in the to-be-displayed text have been displayed in advance, and the total number of the to-be-displayed characters contained in the to-be-displayed text.

Further, the to-be-displayed character obtaining module 801 is further configured to: obtain a to-be-displayed text, the to-be-displayed text including at least one to-be-displayed character; and separate at least one to-be-displayed character from the to-be-displayed text based on a first encoding of the to-be-displayed character.

Further, the character display apparatus 800 is further configured to: generate a character texture of the to-be-displayed character: select a plurality of alternative characters from a character library to generate an alternative character set; and generate a character texture of each of the alternative characters.

Further, the character display module 803 is further configured to: select randomly a plurality of alternative characters from the alternative character set; and display alternately a character texture of each of the plurality of alternative characters at the display position in the first time.

Further, the character display module 803 is further configured to display the character texture of the to-be-displayed character at the display position after the first time has lapsed.

The apparatus shown in FIG. 8 may perform the method of the embodiments shown in FIGS. 1 to 6, and the parts of the present embodiments not described in detail, may refer to the relevant description of the embodiments shown in FIGS. 1 to 6. The performing process and technical effect of the technical solution are described in the embodiments shown in FIGS. 1 to 6, details of which will be omitted herein.

Figure 9:
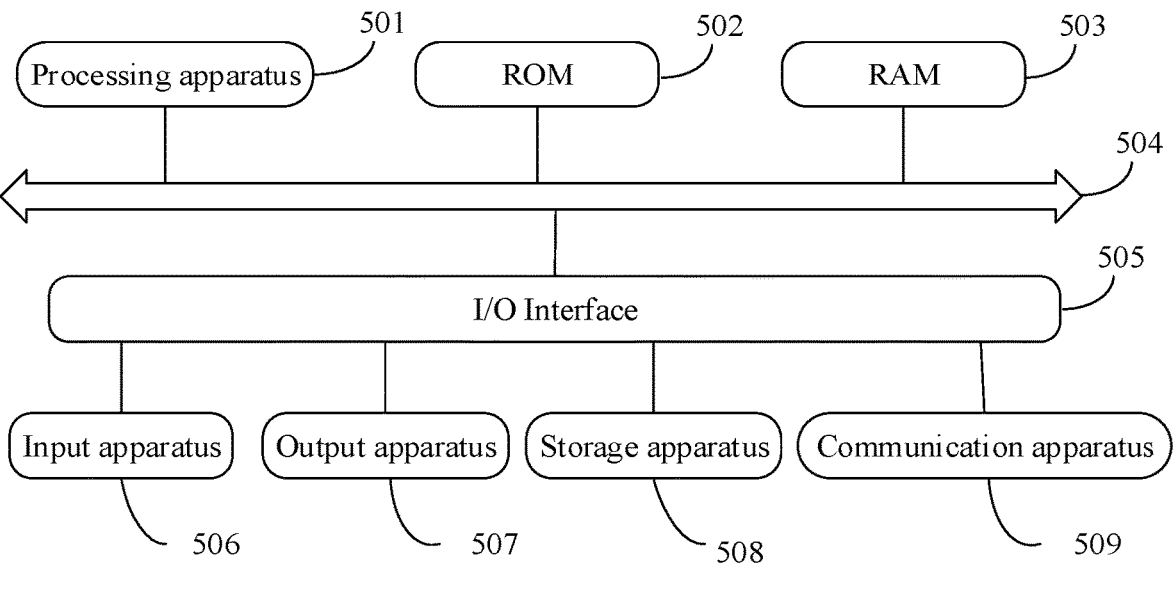
FIG. 9 is a schematic structural diagram of an electronic device according to an embodiment of the present disclosure.

FIG. 9 illustrates a schematic structural diagram of an electronic device (for example, a terminal device or a server) according to the embodiments of the present disclosure, which is adapted to implement the embodiments of the present disclosure. The terminal device in the embodiments of the present disclosure may include, but is not limited to, a mobile terminal device, such as a mobile phone, a notebook computer, a digital broadcast receiver, a personal digital assistant (PDA), a Portable Android Device (PAD), a portable multimedia player (PMP), a vehicle-mounted terminal (e.g., a vehicle-mounted navigation terminal) and a fixed terminal such as a digital TV, a desktop computer, a smart home device, etc. The electronic device illustrated in FIG. 9 is only an example, and should not bring any limitation to the function and scope of use of the embodiments of the present disclosure.

As illustrated in FIG. 9, the electronic device 900 may include a processing apparatus (such as a central processing unit, a graphics processor, etc.) 901, which can perform various appropriate actions and processing based on a program stored in a read-only memory (ROM) 902 or based on a program loaded into a random access memory (RAM) 903 from a storage apparatus 908, to implement the character display method as described in the embodiments of the present disclosure. Various programs and data required for operations of the electronic device 900 are stored in the RAM 903. The processing apparatus 901, the ROM 902, and the RAM 903 are connected to each other through a bus 904. An input/output (I/O) interface 905 is also connected to the bus 904.

Generally, connected to the I/O interface 905 are an input apparatus 906 such as a touch screen, a touch pad, a keyboard, a mouse, a camera, a microphone, an accelerometer, a gyroscope, etc., an output apparatus 907 such as a liquid crystal display (LCD), a speaker, a vibration, etc., a storage apparatus 908 such as a magnetic tape, a hard disk, etc.; and a communication apparatus 909. The communication apparatus 909 may allow the electronic device 900 to perform wireless or wired communication with other devices to exchange data. Although FIG. 9 illustrates an electronic device 900 including various apparatuses, it should be understood that the electronic device 900 does not require to be implemented or provided with all of the illustrated apparatuses. The electronic device 900 may alternatively be implemented or provided with more or fewer apparatuses.

In a further embodiment, according to an embodiment of the present disclosure, the process described above with reference to the flowchart can be implemented as a computer software program. For example, an embodiment of the present disclosure includes a computer program product, which includes a computer program carried on a non-transitory computer readable medium, and the computer program contains program codes for implementing the method illustrated in any one of the flowcharts. In such an embodiment, the computer program may be downloaded from the network through the communication apparatus 909 and is installed, or the computer program may be installed from the storage apparatus 908, or the computer program may be installed from the ROM 902. When the computer program is executed by the processing apparatus 901, the above-mentioned functions defined in the method according to any one of the embodiments of the present disclosure are implemented.

It should be noted that the above-mentioned computer-readable medium in the present disclosure may be a computer-readable signal medium, a computer-readable storage medium, or a combination thereof. The computer-readable storage medium may be, for example, but not limited to, an electrical, magnetic, optical, electromagnetic, infrared, or semiconductor system, apparatus, device, or a combination thereof. More specific examples of the computer-readable storage media may include, but are not limited to: electrical connection with one or more wires, a portable computer disk, a hard disk, a random access memory (RAM), a read-only memory (ROM), an erasable programmable read only memory (EPROM or flash memory), an optical fiber, a portable compact disk read only memory (CD-ROM), an optical storage device, a magnetic storage device, or any suitable combination thereof. In the present disclosure, the computer-readable storage medium may be any tangible medium that contains or stores a program, and the program may be used by or in combination with an instruction execution system, apparatus, or device. In the present disclosure, the computer-readable signal medium may include data signals propagated in a baseband or as a part of a carrier wave, and computer-readable program codes are carried therein. The propagated data signals can take many forms, including but not limited to, electromagnetic signals, optical signals, or any suitable combination thereof. The computer-readable signal medium may be any computer-readable medium other than the computer-readable storage medium. The computer-readable signal medium may send, propagate or transmit a program for use by or in combination with the instruction execution system, apparatus, or device. The program codes contained on the computer-readable medium can be transmitted by any suitable medium, including but not limited to: a wire, an optical cable, a radio frequency (RF), or any suitable combination thereof.

In some embodiments, the client and the server may communicate with any currently known or future developed network protocol such as Hyper Text Transfer Protocol (HTTP), and can interconnect with digital data communication (e.g., communication network) in any form or medium. Examples of communication networks include a local area network ("LAN"), a wide area network ("WAN"), the Internet, and an end-to-end network (for example, ad hoc end-to-end network), as well as any currently known or future developed networks.

The above-mentioned computer-readable medium may be included in the above-mentioned electronic device: or it may exist alone without being assembled into the electronic device.

The above-mentioned computer-readable medium may carry one or more programs.

The above-mentioned one or more programs, when executed by the electronic device, causes the electronic device to implement the character display method.

The computer program codes for performing the operations of the present disclosure can be written in one or more programming languages or a combination thereof. The above-mentioned programming languages include, but are not limited to, object-oriented programming languages-such as Java, Smalltalk, C++, and conventional procedural programming languages-such as "C" language or similar programming languages. The program codes can be executed entirely on a user's computer, partly on the user's computer, as an independent software package, partly on the user's computer and partly on a remote computer, or entirely on the remote computer or server. In a case of the remote computer, the remote computer can be connected to the user's computer through any kind of networks, including a local area network (LAN) or a wide area network (WAN), or can be connected to an external computer (for example, through Internet connection using an Internet service provider).

The flowcharts and block diagrams in the accompanying drawings illustrate the possible implementation architectures, functions, and operations of the system, method, and computer program product according to various embodiments of the present disclosure. In this regard, each block in the flowcharts or block diagrams can represent a module, a program segment, or some of codes, and the module, the program segment, or some of codes contain one or more executable instructions for realizing specified logic functions. It should be noted that, in some alternative implementations, the functions marked in the blocks may occur in a different order from the order marked in the drawings. For example, two blocks shown one after the other can actually be performed substantially in parallel, or they can sometimes be performed in a reverse order, depending on the involved functions. It should be noted that each block in the block diagrams and/or flowcharts, and a combination of blocks in the block diagrams and/or flowcharts, can be implemented by a dedicated hardware-based system that performs the specified functions or operations, or can be implemented by a combination of dedicated hardware and computer instructions.

The modules or units involved in the described embodiments of the present disclosure may be implemented in software or hardware. A name of the modules or unit does not constitute a limitation on the unit itself under certain circumstance.

The functions described herein above may be performed at least in part by one or more hardware logic components. For example, without limitation, exemplary types of hardware logic components that can be used include: a field programmable gate array (FPGA), an application specific integrated circuit (ASIC), an application specific standard product (ASSP), a system on chip (SOC), a complex programmable logical device (CPLD) and so on.

In the context of the present disclosure, the machine-readable medium may be a tangible medium, which may contain or store a program for use by or in combination with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, device, or any suitable combination thereof. More specific examples of the machine-readable storage medium would include electrical connections based on one or more wires, a portable computer disk, a hard disk, a random access memory (RAM), a read-only memory (ROM), an erasable programmable read-only memory (EPROM or flash memory), an optical fiber, a portable compact disk read only memory (CD-ROM), an optical storage device, a magnetic storage device, or any suitable combination thereof.

According to one or more embodiments of the present disclosure, a character display method is provided. The method includes: obtaining a to-be-displayed character: determining a display position of the to-be-displayed character in a screen based on a current timestamp:

displaying a dynamic character effect at the display position; and displaying the to-be-displayed character at the display position after a first time has lapsed.

Further, the determining the display position of the to-be-displayed character in the screen based on the current timestamp includes: determining a start time and an end time of a to-be-displayed text, the to-be-displayed text including at least one to-be-displayed character: determining an index of a cursor based on the current timestamp, the start time, and the end time; and determining the display position of the to-be-displayed character in the screen based on the index of the cursor.

Further, the determining the index of the cursor based on the current timestamp, the start time, and the end time includes: determining, when a difference between the end time and the start time is greater than a total display time of the to-be-displayed text, the index of the cursor based on the current timestamp, the start time, and the total display time: or determining, when the difference between the end time and the start time is smaller than the total display time, the index of the cursor based on the current timestamp, the start time, the difference, and a percentage of a time in which all of to-be-displayed characters have been displayed in advance.

Further, the displaying the dynamic character effect at the display position includes: displaying randomly a plurality of alternative characters at the display position within a plurality of time slots in the first time, each of the plurality of time slots corresponding to one of the plurality of alternative characters.

Further, the displaying the plurality of alternative characters at the display position within the plurality of time slots in the first time includes: dividing the first time into n time slots, where n is a positive integer greater than 1; and displaying randomly n alternative characters at the display position within the n time slots, the n time slots and the n alternative characters being in a one-to-one correspondence.

Further, the displaying the dynamic character effect at the display position includes: determining a start time and an end time of a to-be-displayed text, the to-be-displayed text including at least one to-be-displayed character: determining an integer based on a first number of alternative characters, the current timestamp, the start time, and the end time: determining the integer as a random number seed when the integer is smaller than the first number: obtaining randomly alternative characters of the first number based on the random number seed; and displaying alternately the alternative characters of the first number at the display position.

Further, the determining the integer based on the first number of the alternative characters, the current timestamp, the start time, and the end time includes: determining, when a difference between the end time and the start time is greater than a total display time of the to-be-displayed text, the integer based on the first number, the current timestamp, the start time, a display duration time of a single to-be-displayed character, and a total number of to-be-displayed characters contained in the to-be-displayed text: or determining, when the difference between the end time and the start time is smaller than the total display time, the integer based on the first number, the current timestamp, the start time, the difference, a percentage of a time in which all of to-be-displayed characters in the to-be-displayed text have been displayed in advance, and the total number of the to-be-displayed characters contained in the to-be-displayed text.

Further, the obtaining the to-be-displayed character includes: obtaining a to-be-displayed text, the to-be-displayed text including at least one to-be-displayed character; and separating the at least one to-be-displayed character from the to-be-displayed text based on a first encoding of the to-be-displayed character.

Further, the method further includes: generating a character texture of the to-be-displayed character: selecting a plurality of alternative characters from a character library to generate an alternative character set; and generating a character texture of each of the plurality of alternative characters.

Further, the displaying the dynamic character effect at the display position includes: selecting randomly a plurality of alternative characters from the alternative character set; and displaying alternately a character texture of each of the plurality of alternative characters at the display position in the first time.

Further, the displaying the to-be-displayed character at the display position after the first time has lapsed includes: displaying the character texture of the to-be-displayed character at the display position after the first time has lapsed.

According to one or more embodiments of the present disclosure, a character display apparatus is provided. The character display apparatus includes: a to-be-displayed character obtaining module configured to obtain a to-be-displayed character: a display position determination module configured to determine a display position of the to-be-displayed character in a screen based on a current timestamp; and a character display module configured to display a dynamic character effect at the display position, and display the to-be-displayed character at the display position after a first time has lapsed.

Further, the display position determination module is further configured to: determine a start time and an end time of a to-be-displayed text, the to-be-displayed text including at least one to-be-displayed character: determine an index of a cursor based on the current timestamp, the start time, and the end time; and determine the display position of the to-be-displayed character in the screen based on the index of the cursor.

Further, the display position determination module is further configured to: determine, when a difference between the end time and the start time is greater than a total display time of the to-be-displayed text, the index of the cursor based on the current timestamp, the start time, and the total display time: or determine, when the difference between the end time and the start time is smaller than the total display time, the index of the cursor based on the current timestamp, the start time, the difference, and a percentage of a time in which all of to-be-displayed characters have been displayed in advance.

Further, the character display module is further configured to: display randomly a plurality of alternative characters at the display position within a plurality of time slots in the first time, each of the plurality of time slots corresponding to one of the plurality of alternative characters.

Further, the character display module is further configured to: divide the first time into n time slots, where n is a positive integer greater than 1; and display randomly n alternative characters at the display position within the n time slots, the n time slots and the n alternative characters being in a one-to-one correspondence.

Further, the character display module is further configured to: determine a start time and an end time of a to-be-displayed text, the to-be-displayed text including at least one to-be-displayed character: determine an integer based on a first number of alternative characters, the current timestamp, the start time, and the end time: determine the integer as a random number seed when the integer is smaller than the first number: obtain randomly alternative characters of the first number based on the random number seed; and display alternately the alternative characters of the first number at the display position.

Further, the character display module is further configured to: determine, when a difference between the end time and the start time is greater than a total display time of the to-be-displayed text, the integer based on the first number, the current timestamp, the start time, a display duration time of a single to-be-displayed character, and a total number of to-be-displayed characters contained in the to-be-displayed text; or determine, when the difference between the end time and the start time is smaller than the total display time, the integer based on the first number, the current timestamp, the start time, the difference, a percentage of a time in which all of to-be-displayed characters in the to-be-displayed text have been displayed in advance, and the total number of the to-be-displayed characters contained in the to-be-displayed text.

Further, the to-be-displayed character obtaining module is further configured to: obtain a to-be-displayed text, the to-be-displayed text including at least one to-be-displayed character; and separate the at least one to-be-displayed character from the to-be-displayed text based on a first encoding of the to-be-displayed character.

Further, the character display apparatus is further configured to: generate a character texture of the to-be-displayed character; select a plurality of alternative characters from a character library to generate an alternative character set; and generate a character texture of each of the plurality of alternative characters.

Further, the character display module is further configured to: select randomly a plurality of alternative characters from the alternative character set; and display alternately a character texture of each of the plurality of alternative characters at the display position in the first time.

Further, the character display module is further configured to: display the character texture of the to-be-displayed character at the display position after the first time has lapsed.

According to one or more embodiments, an electronic device is provided. The electronic device includes at least one processor, and a memory having stored computer-readable instructions thereon. The memory is coupled to the at least one processor and in communication with the at least one processor. The computer-readable instructions are executable by the at least processor. The computer-readable instructions, when executed by the at least processor, cause the at least one processor to implement the character display method as described in any one of the above embodiments.

According to one or more embodiments, a non-transient computer-readable storage medium is provided. The non-transient computer-readable storage medium has computer-readable instructions stored thereon. The computer-readable instructions are configured to cause the computer to implement the character display method as described in any one of the above embodiments.

The above description is only an explanation of preferred embodiments and the applied technical principles of the present disclosure. Those skilled in the art should understand that the scope of disclosure involved in the present disclosure is not limited to the technical solutions formed by the specific combination of the above technical features, and shall cover other technical solutions formed by arbitrarily combining the above technical features or the equivalent features without departing from the above disclosed concept, for example, the technical solutions formed by replacing the above-mentioned features with the technical features disclosed in the present disclosure (but not limited to) having similar functions.

What is claimed is:

1. A character display method, comprising:

obtaining a to-be-displayed character;

determining a display position of the to-be-displayed character in a screen based on a current timestamp;

displaying a dynamic character effect at the display position within a first time; and displaying the to-be-displayed character at the display position after the first time has lapsed, wherein said determining the display position of the to-be-displayed character in the screen based on the current timestamp comprises:

determining a start time and an end time of a to-be-displayed text, wherein the to-be-displayed text comprises at least one to-be-displayed character;

determining an index of a cursor based on the current timestamp, the start time, and the end time; and determining the display position of the to-be-displayed character in the screen based on the index of the cursor, wherein said determining the index of the cursor based on the current timestamp, the start time, and the end time comprises:

determining, when a difference between the end time and the start time is greater than a total display time of the to-be-displayed text, the index of the cursor based on the current timestamp, the start time, and the total display time, wherein $$I_{cursor} = \left\lfloor \frac{(\text{timestamp} - \text{startTime})}{\text{charTime}} \right\rfloor \text{ if } \text{duration} > \text{charTime} * \text{charCount};$$

determining, when the difference between the end time and the start time is smaller than the total display time, the index of the cursor based on the current timestamp, the start time, the difference, and a percentage of a time in which all of to-be-displayed characters have been displayed in advance, wherein $$I_{cursor} =$$

$$\left\lfloor \frac{(\text{timestamp} - \text{startTime}) * \text{charCount}}{\text{showPercent} * \text{duration}} \right\rfloor \text{ if } \text{duration} > \text{charTime} * \text{charCount},$$

where $I_{cursor}$ represents the index of the cursor of the to-be-displayed character at the current timestamp, charTime is a display time of the to-be-displayed character, charCount is the number of to-be-displayed characters in the to-be-displayed text; duration=endTime−startTime, which is the difference between the end time and the start time and represents a display duration of the to-be-displayed text; timestamp represents the current timestamp, startTime represents the start time of the to-be-displayed text, and endTime represents the end time of the to-be-displayed text, and the showPercent is a control parameter, which represents the percentage of a time in which all of the to-be-displayed characters have been displayed and controls a total time in which a typing effect has been displayed.

2. The method according to claim 1, wherein said displaying the dynamic character effect at the display position comprises:

displaying randomly a plurality of alternative characters at the display position within a plurality of time slots in the first time, wherein each of the plurality of time slots corresponds to one of the plurality of alternative characters.

3. The method according to claim 2, wherein said displaying the plurality of alternative characters at the display position within the plurality of time slots in the first time comprises:

dividing the first time into n time slots, where n is a positive integer greater than 1; and displaying randomly n alternative characters at the display position within the n time slots, wherein the n time slots and the n alternative characters are in a one-to-one correspondence.

4. The method according to claim 1, wherein said displaying the dynamic character effect at the display position comprises:

determining a start time and an end time of a to-be-displayed text, wherein the to-be-displayed text comprises at least one to-be-displayed character;

determining an integer based on a first number of alternative characters, the current timestamp, the start time, and the end time;

determining the integer as a random number seed when the integer is smaller than the first number;

obtaining randomly alternative characters of the first number based on the random number seed; and displaying alternately the alternative characters of the first number at the display position.

5. The method according to claim 4, wherein said determining the integer based on the first number of the alternative characters, the current timestamp, the start time, and the end time comprises:

determining, when a difference between the end time and the start time is greater than a total display time of the to-be-displayed text, the integer based on the first number, the current timestamp, the start time, a display duration time of a single to-be-displayed character, and a total number of to-be-displayed characters contained in the to-be-displayed text; or determining, when the difference between the end time and the start time is smaller than the total display time, the integer based on the first number, the current timestamp, the start time, the difference, a percentage of a time in which all of to-be-displayed characters in the to-be-displayed text have been displayed in advance, and the total number of the to-be-displayed characters contained in the to-be-displayed text.

6. The method according to claim 1, wherein said obtaining the to-be-displayed character comprises:

obtaining a to-be-displayed text, wherein the to-be-displayed text comprises at least one to-be-displayed character; and separating the at least one to-be-displayed character from the to-be-displayed text based on a first encoding of the to-be-displayed character.

7. The method according to claim 6, further comprising:

generating a character texture of the to-be-displayed character;

selecting a plurality of alternative characters from a character library to generate an alternative character set; and generating a character texture of each of the plurality of alternative characters.

8. The method according to claim 7, wherein said displaying the dynamic character effect at the display position comprises:

selecting randomly a plurality of alternative characters from the alternative character set; and displaying alternately a character texture of each of the plurality of alternative characters at the display position in the first time.

9. The method according to claim 7, wherein said displaying the to-be-displayed character at the display position after the first time has lapsed comprises:

displaying the character texture of the to-be-displayed character at the display position after the first time has lapsed.

10. A non-transitory computer-readable storage medium, having computer-readable instructions stored thereon, wherein the computer-readable instructions, when executed by a computer, cause the computer to implement the character display method according to claim 1.

11. An electronic device, comprising:

a memory having computer-readable instructions stored thereon; and a processor configured to execute the computer-readable instructions to obtain a to-be-displayed character;

determine a display position of the to-be-displayed character in a screen based on a current timestamp;

display a dynamic character effect at the display position within a first time; and display the to-be-displayed character at the display position after the first time has lapsed, wherein said determining the display position of the to-be-displayed character in the screen based on the current timestamp comprises:

determining a start time and an end time of a to-be-displayed text, wherein the to-be-displayed text comprises at least one to-be-displayed character;

determining an index of a cursor based on the current timestamp, the start time, and the end time; and determining the display position of the to-be-displayed character in the screen based on the index of the cursor, wherein said determining the index of the cursor based on the current timestamp, the start time, and the end time comprises:

determining, when a difference between the end time and the start time is greater than a total display time of the to-be-displayed text, the index of the cursor based on the current timestamp, the start time, and the total display time, wherein $$I_{cursor} = \left\lfloor \frac{(\text{timestamp} - \text{startTime})}{\text{charTime}} \right\rfloor \text{ if duration} > \text{charTime} * \text{charCount};$$

determining, when the difference between the end time and the start time is smaller than the total display time, the index of the cursor based on the current timestamp, the start time, the difference, and a percentage of a time in which all of to-be-displayed characters have been displayed in advance, wherein $$I_{cursor} =$$

$$\left\lfloor \frac{(timestamp - startTime) * charCount}{showPercent * duration} \right\rfloor \text{ if } duration > charTime * charCount,$$

where $I_{cursor}$ represents the index of the cursor of the to-be-displayed character at the current timestamp, charTime is a display time of the to-be-displayed character, charCount is the number of to-be-displayed characters in the to-be-displayed text; duration=endTime−startTime, which is the difference between the end time and the start time and represents a display duration of the to-be-displayed text; timestamp represents the current timestamp, startTime represents the start time of the to-be-displayed text, and endTime represents the end time of the to-be-displayed text, and the showPercent is a control parameter, which represents the percentage of a time in which all of the to-be-displayed characters have been displayed and controls a total time in which a typing effect has been displayed.

12. The electronic device according to claim 11, wherein said displaying the dynamic character effect at the display position comprises:

displaying randomly a plurality of alternative characters at the display position within a plurality of time slots in the first time, wherein each of the plurality of time slots corresponds to one of the plurality of alternative characters.

13. The electronic device according to claim 12, wherein said displaying the plurality of alternative characters at the display position within the plurality of time slots in the first time comprises:

dividing the first time into n time slots, where n is a positive integer greater than 1; and displaying randomly n alternative characters at the display position within the n time slots, wherein the n time slots and the n alternative characters are in a one-to-one correspondence.

14. The electronic device according to claim 11, wherein said displaying the dynamic character effect at the display position comprises:

determining a start time and an end time of a to-be-displayed text, wherein the to-be-displayed text comprises at least one to-be-displayed character;

determining an integer based on a first number of alternative characters, the current timestamp, the start time, and the end time;

determining the integer as a random number seed when the integer is smaller than the first number;

obtaining randomly alternative characters of the first number based on the random number seed; and displaying alternately the alternative characters of the first number at the display position.

15. The electronic device according to claim 14, wherein said determining the integer based on the first number of the alternative characters, the current timestamp, the start time, and the end time comprises:

determining, when a difference between the end time and the start time is greater than a total display time of the to-be-displayed text, the integer based on the first number, the current timestamp, the start time, a display duration time of a single to-be-displayed character, and a total number of to-be-displayed characters contained in the to-be-displayed text; or determining, when the difference between the end time and the start time is smaller than the total display time, the integer based on the first number, the current timestamp, the start time, the difference, a percentage of a time in which all of to-be-displayed characters in the to-be-displayed text have been displayed in advance, and the total number of the to-be-displayed characters contained in the to-be-displayed text.

16. The electronic device according to claim 11, wherein said obtaining the to-be-displayed character comprises:

obtaining a to-be-displayed text, wherein the to-be-displayed text comprises at least one to-be-displayed character; and separating the at least one to-be-displayed character from the to-be-displayed text based on a first encoding of the to-be-displayed character.

* * * * *